(12) United States Patent
Oriet

(10) Patent No.: US 9,283,836 B2
(45) Date of Patent: Mar. 15, 2016

(54) STRUCTURAL ELECTRIC TANDEM AXLE MODULE

(71) Applicant: Leo P. Oriet, Rochester Hills, MI (US)

(72) Inventor: Leo P. Oriet, Rochester Hills, MI (US)

( * ) Notice: Subject to any disclaimer, the term of this patent is extended or adjusted under 35 U.S.C. 154(b) by 98 days.

(21) Appl. No.: 14/041,933

(22) Filed: Sep. 30, 2013

(65) Prior Publication Data

US 2015/0090505 A1   Apr. 2, 2015

(51) Int. Cl.
| | |
|---|---|
| *B60K 17/36* | (2006.01) |
| *B60K 17/16* | (2006.01) |
| *B60K 1/00* | (2006.01) |
| *H02K 16/00* | (2006.01) |
| *B60K 6/46* | (2007.10) |
| *B60K 17/12* | (2006.01) |
| *B60K 17/356* | (2006.01) |
| *H02K 7/00* | (2006.01) |

(52) U.S. Cl.
CPC ... *B60K 1/00* (2013.01); *B60K 6/46* (2013.01); *B60K 17/12* (2013.01); *B60K 17/16* (2013.01); *B60K 17/356* (2013.01); *B60K 17/36* (2013.01); *H02K 7/006* (2013.01); *H02K 16/005* (2013.01); *Y10S 903/906* (2013.01); *Y10S 903/916* (2013.01)

(58) Field of Classification Search
CPC ...... B60K 17/12; B60K 17/16; B60K 17/165; B60K 17/356; B60K 17/36; B60W 10/14; H02K 7/006; H02K 16/005; Y10S 903/906; Y10S 903/916

See application file for complete search history.

(56) References Cited

U.S. PATENT DOCUMENTS

| | | | | | |
|---|---|---|---|---|---|
| 3,626,862 | A | * | 12/1971 | Korn | B61C 9/44 |
| | | | | | 105/131 |
| 4,461,217 | A | * | 7/1984 | Girod | B61C 9/50 |
| | | | | | 105/135 |
| 5,207,060 | A | * | 5/1993 | Sheets | 60/483 |
| 5,908,077 | A | * | 6/1999 | Moore | 180/65.25 |
| 6,005,358 | A | * | 12/1999 | Radev | 318/139 |
| 6,380,653 | B1 | * | 4/2002 | Seguchi | B60K 6/26 |
| | | | | | 310/112 |
| 6,401,849 | B1 | * | 6/2002 | Seguchi et al. | 180/65.6 |
| 7,497,285 | B1 | * | 3/2009 | Radev | 180/65.225 |
| 2003/0010547 | A1 | * | 1/2003 | Wachauer | 180/65.1 |
| 2003/0019674 | A1 | * | 1/2003 | Duan | 180/65.3 |
| 2006/0197375 | A1 | * | 9/2006 | Delaney | 303/20 |
| 2006/0272866 | A1 | * | 12/2006 | Ziech | 180/24.1 |
| 2009/0294188 | A1 | * | 12/2009 | Cole | 180/65.1 |
| 2011/0031838 | A1 | * | 2/2011 | Serra et al. | 310/114 |
| 2011/0094807 | A1 | * | 4/2011 | Pruitt et al. | 180/65.6 |
| 2014/0284130 | A1 | * | 9/2014 | Knoblauch | 180/242 |
| 2015/0065283 | A1 | * | 3/2015 | Nilsson et al. | 475/150 |

\* cited by examiner

*Primary Examiner* — Barry Gooden, Jr.
(74) *Attorney, Agent, or Firm* — George L. Boller

(57) ABSTRACT

A structural electric tandem axle module (13) for propelling a vehicle such as a large vocational vehicle without applying torque to the chassis frame of the vehicle as the module operates.

13 Claims, 4 Drawing Sheets

STRUCTURAL ELECTRIC TANDEM AXLE MODULE

FIELD OF THE INVENTION

This invention relates generally to wheeled vehicles, especially large vocational vehicles. More particularly, the invention relates to a tandem axle module which delivers torque to wheels of a tandem axle for propelling a vehicle.

SPONSORSHIP

This invention has been sponsored by the National Research Council Canada but is solely owned by the inventor.

BACKGROUND OF THE INVENTION

A typical chassis frame of a commercial truck, a motor bus, a motor coach, and many military vehicles is an assembled structure having right and left longitudinal side rails joined together by transverse cross members. Consequently, the central portion of such a chassis frame is mostly an open structure which allows the frame to twist longitudinally and exhibit torsional compliance when the vehicle traverses uneven surfaces and when torque is transferred from a driveline to the frame.

A typical driveline of commercially manufactured trucks is headed by an internal combustion engine and extends longitudinally from front to rear of the truck with the engine crankshaft rotating about a longitudinally extending axis. When the engine is accelerated to accelerate the truck, the engine transfers equal torque through the driveline to the wheels and to the frame. Although the frame is torsionally compliant, certain torsionally rigid components, such as compressed air tank cylinders and cylindrical fuel tanks are often mounted on the frame's side rails.

As a truck travels over an uneven surface, the suspension system transfers torque into side-rail-mounted components which, like a fuel tank, have closed, torsionally rigid, cross sections. Over time, torque applied to a chassis frame can result in a condition sometimes referred to as "fuel tank walking." That condition is characterized by a fuel tank turning within its mounting straps and in the extreme, disappearance of a fuel tank fill tube underneath the truck cab.

A commercial truck also comprises a body mounted on the chassis frame. A typical truck body comprises a cab and a front engine compartment hood. The cab is a torsionally rigid structure which is also subjected to repeated twisting by torsion being applied to the chassis frame by the engine. The front engine compartment hood is also a torsionally rigid structure. Those body components can, over time, experience micro fractures which can propagate to the point of causing catastrophic component failure—all attributable to the repeated absorption of engine-induced torsion. Broken hood hinges are one example of such failures.

SUMMARY OF THE INVENTION

The present invention provides a solution for mitigating the aforementioned consequences of repeated torsion absorption by a chassis frame, consequences which include not only failure of frame-mounted components like compressed air tanks and fuel tanks but also failures in the chassis frame itself, such as the frame's side rails, in various chassis components associated with the frame, such as transverse torque rods, and in various body components like hood hinges.

Briefly, mitigation of the aforementioned consequences of repeated torsion absorption is achieved through a structural electric tandem axle module which when propelling a vehicle does not transfer torque to the chassis frame.

The module comprises a dual-rotor electric motor. One rotor delivers torque through a differential gear mechanism of a front tandem axle to wheels at the axle's ends. The other rotor delivers torque through a differential gear mechanism of a rear tandem axle to wheels at the axle's ends.

The shafts of the respective rotors deliver equal torques to the respective differentials, but in opposite directions of rotation. Because the rotors are forced to rotate in opposite directions by the same electromagnetic force acting between them, the sum of the torques delivered to the two tandem axles by the rotors is two times greater than the torque output of a conventional truck transmission driveline.

In the conventional art, one half of the rotational mechanical torque is wasted in repeatedly elastically deforming the chassis frame rails and stressing frame and frame-mounted components to the point that they will eventually fail.

The disclosed structural electric tandem axle module eliminates this waste of energy and its inherent consequences. In doing so, the disclosed module endows a vehicle with enhanced road handling characteristics by allowing each rigid dual wheel axle to pivot about a longitudinal center line of the vehicle while maintaining secure mechanical articulation and full tire contact with road surfaces.

The module is maintenance-friendly because it is a self-contained unit which can be quickly replaced in the field or in a maintenance facility.

The dual rotor and the structural casing which houses it provide for rigid axle rotational articulation about the module's centerline while canceling out mechanical torque input to the chassis frame, thereby eliminating the problems caused by engine-induced torque input the chassis frame, including overloading the right front steered wheel and tire which occurs in conventional trucks.

The module that can be used in various on-road and off-road applications including: commercial vehicles such as trucks, buses, and motorcoaches; military, agricultural, construction, and rail vehicles; and vehicles which are connected to an electrical distribution grid, such as electric rail lines.

The module can enhance vehicle efficiency by energy recovery during vehicle braking and it may offer opportunities for weight reduction by enabling use of lighter weight frame rails. Common modules for various vehicles can provide economies of scale in mass-production manufacture of modules.

One general aspect of the invention relates to the subject matter set forth in independent Claim 1.

Another general aspect of the invention relates to the subject matter set forth in independent Claim 7.

Further aspects are set forth in the various dependent Claims.

The foregoing summary, accompanied by further detail of the disclosure, will be presented in the Detailed Description below with reference to the following drawings that are part of this disclosure.

DETAILED DESCRIPTION

Figure 1:
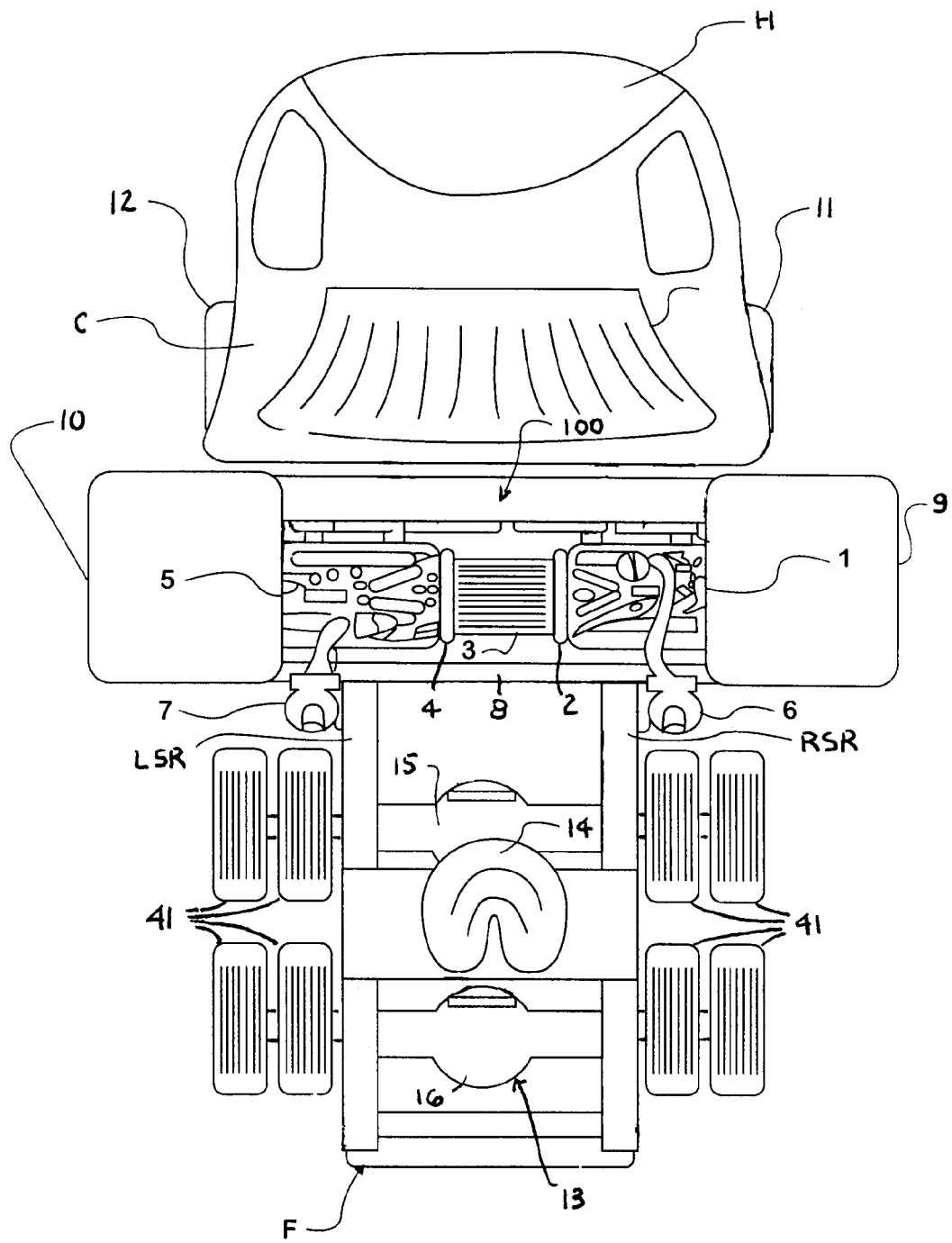
FIG. 1 is a top plan view of a truck vehicle.

FIG. 1 shows a truck vehicle T like the one shown in FIG. 7 of Pub. No. US 2012 0152631.

Truck vehicle T has a chassis frame F which provides underlying support for an engine and cooling module support frame 8 which itself provides underlying support for a transverse-mounted dual-engine, variable power drive 100. Chassis frame F has a right side rail RSR and a left side rail LSR.

Drive 100, as described in Pub. No. US 2012 0152631, comprises a starboard side turbodiesel propulsion engine 1, a starboard side hydraulic internal wet-disk clutch 2, an electric generator 3, a port side hydraulic internal wet-disk clutch 4, a port side turbodiesel propulsion engine 5, a starboard side engine exhaust stack 6, including a diesel particulate filter (DPF) and optional exhaust treatment apparatus, and a port side engine exhaust stack 7, including a diesel particulate filter (DPF) and optional exhaust treatment apparatus.

Support frame 8 and the components which it supports can be covered by a cover which is shown in open position in FIG. 1 to provide service access to drive 100. The cover comprises movable starboard and port side clamshell halves 9, 10 which are swung closed to cover the drive. Exhaust stacks 6, 7 are shaped to place their tailpipes outside the cover when the cover is closed.

Truck vehicle T comprises a cab C having an interior compartment for a driver of the vehicle. Right and left front steerable wheels 11, 12 respectively are suspended from chassis frame F on right and left sides for steering truck vehicle T. A structural electric tandem axle module 13 is mounted on chassis frame F rearward of cab C. Supported on chassis frame F over module 13 is a fifth wheel 14 to which a trailer (not shown) can be connected for towing by truck vehicle T.

Figure 2:
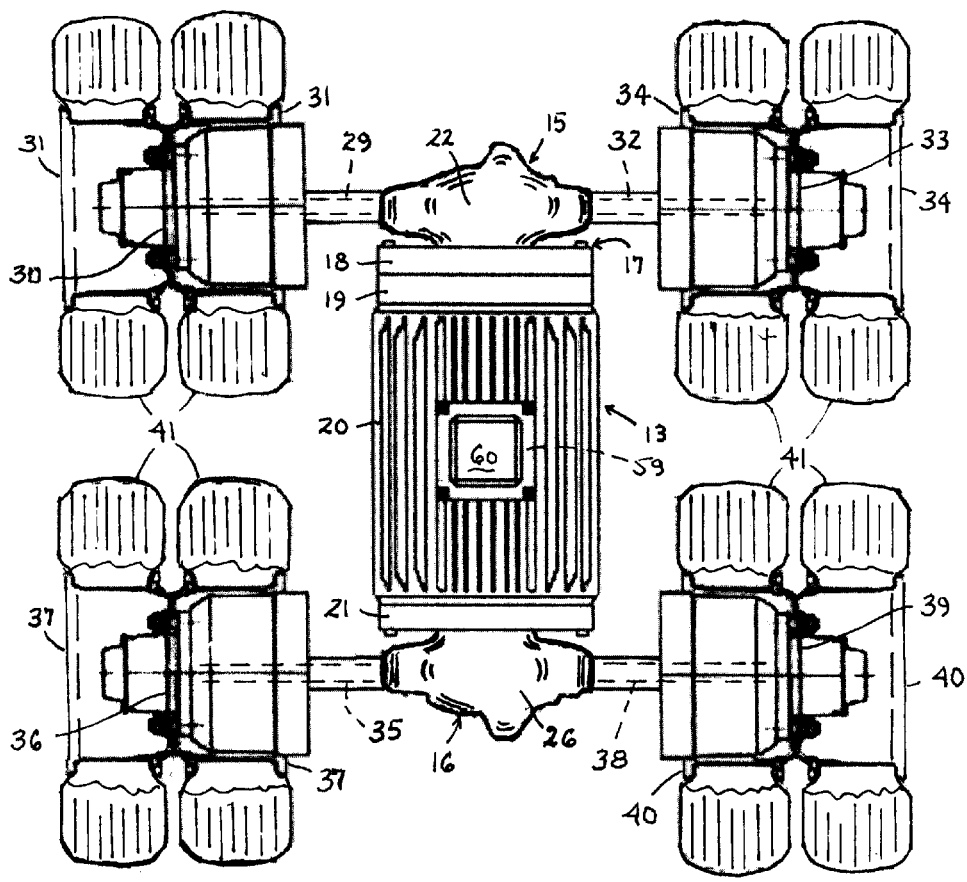
FIG. 2 is a top plan view of a structural electric tandem axle module in the truck vehicle.

FIG. 2 shows structural electric tandem axle module 13 to comprise a front drive axle 15 and a rear drive axle 16. Between the two axles 15, 16 is a succession of structural elements fastened together to form a structurally rigid housing 17 at opposite lengthwise ends of which drive axles 15 and 16 are respectively mounted. Housing 17 is securely mounted on chassis frame F between right side rail RSR and left side rail LSR.

Figure 3:
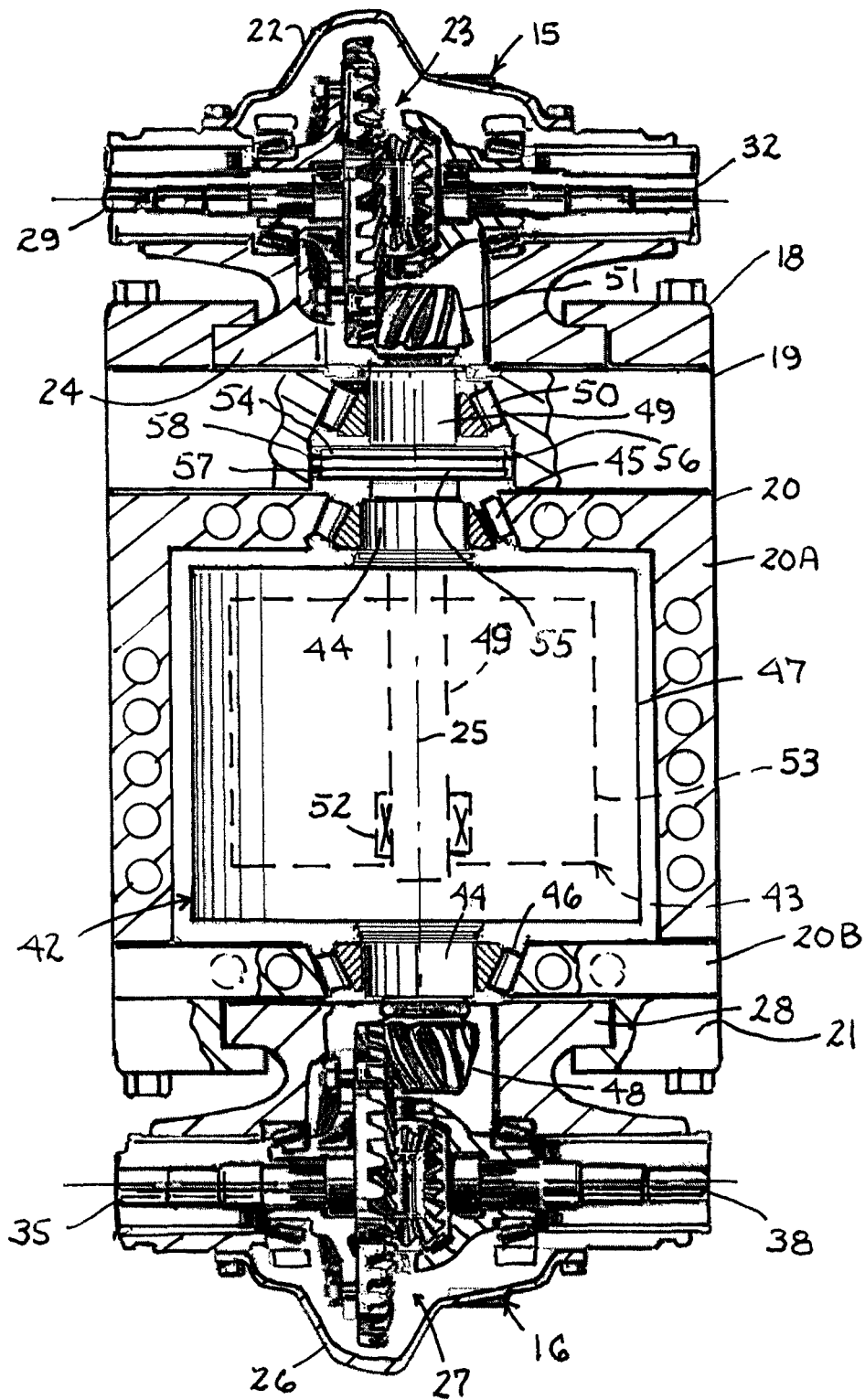
FIG. 3 is cross section view through a portion of a structural electric tandem axle module taken in the same direction as FIG. 2 and enlarged.

The structural elements forming rigid housing 17 comprise, in order from front to rear, a front drive axle pivot bearing 18, a brush holder ring 19, an electric motor casing 20, and a rear drive axle pivot bearing 21. FIG. 3 shows electric motor casing 20 to comprise a first part 20A and a second part 20B. First part 20A has an end wall confronting brush holder ring 19 and a cylindrical side wall extending to an open end which is closed by second part 20B.

Front drive axle 15 comprises a front differential casing 22 which encases a front differential gear mechanism 23 and which at an end toward brush holder ring 19 has a circular flange 24 which is supported by front drive axle pivot bearing 18 for pivotal motion about a longitudinal axis 25 of module 13.

Rear drive axle 16 comprises a rear differential casing 26 which encases a rear differential gear mechanism 27 and which at an end toward second part 20B of motor casing 20 has a circular flange 28 which is supported by rear axle pivot bearing 21 for pivotal motion about axis 25.

Front drive axle 15 has a left front drive shaft 29 extending from front differential gear mechanism 23 to a left front axle wheel hub 30 on which left front axle wheels 31 are mounted and a right front drive shaft 32 extending from front differential gear mechanism 23 to a right front axle wheel hub 33 on which right front axle wheels 34 are mounted. Left front drive shaft 29 is coupled to wheel hub 30 so that both rotate in unison. Right front drive shaft 32 is coupled to wheel hub 33 so that both rotate in unison.

Rear drive axle 16 has a left rear drive shaft 35 extending from rear differential gear mechanism 27 to a left rear axle wheel hub 36 on which left rear axle wheels 37 are mounted and a right rear drive shaft 38 extending from rear differential gear mechanism 27 to a right rear axle wheel hub 39 on which right rear axle wheels 40 are mounted. Left rear drive shaft 35 is coupled to wheel hub 36 so that both rotate in unison. Right rear drive shaft 38 is coupled to wheel hub 39 so that both rotate in unison.

All wheels comprise pneumatic tires 41.

Structural electric tandem axle module 13 further comprises an outer rotor 42 and an inner rotor 43 which collectively form an electric motor.

Outer rotor 42 has an outer rotor shaft 44 journaled for low-friction rotation about axis 25 via taper bearing assemblies 45, 46 situated in respective bearing mounts in housing 20. Between taper bearing assemblies 45, 46, outer rotor 42 comprises a permanent magnet assembly 47 which is disposed within motor casing 20 and which rotates with outer rotor shaft 44. At one end beyond taper bearing assembly 46, outer rotor shaft 44 has a bevel pinion gear 48 which couples outer rotor 42 with rear differential gear mechanism 27.

Inner rotor 43 has an inner rotor shaft 49 arranged for rotation about axis 25. One taper bearing assembly 50 is situated in a bearing mount in brush holder ring 19 to provide a first point of support for low-friction rotation of inner rotor shaft 49 about axis 25. At one end beyond taper bearing assembly 50, inner rotor shaft 49 has a bevel pinion gear 51 which couples inner rotor 43 with front differential gear mechanism 23.

The end of outer rotor shaft 44 which is supported by taper bearing assembly 45 comprises a clearance hole concentric with axis 25. Inner rotor shaft 49 extends from the end supported by taper bearing assembly 50 and passes through that clearance hole to an opposite end where a second point of support for low-friction rotation of inner rotor shaft 49 about axis 25 is provided by a taper bearing assembly 52 which is itself situated in a frame of outer rotor 42 which also supports permanent magnets of permanent magnet assembly 47. The clearance hole is sealed by a seal between the two rotor shafts. Consequently, both rotors 42, 43 are supported for rotation about axis 25.

Inner rotor 43 comprises an armature 53 which is supported on, and rotates with, inner rotor shaft 49. Brush holder ring 19 houses an inner rotor slip ring wheel 54 which is mounted on, and rotates with, inner rotor shaft 49. Inner rotor slip rings 55, 56 are axially spaced apart and extend circumferentially around the outside of inner rotor slip ring wheel 54. Inner rotor electric brushes 57, 58 on an inner wall of brush holder ring 19 are biased into contact with respective slip rings 55, 56.

Armature 53 comprises a frame on which an inner rotor armature winding is disposed. The inner rotor armature winding is electrically connected to slip rings 55, 56, enabling the winding to connect through the slip rings and brushes 57, 58 to electric terminations housed within a compartment 59 (FIG. 2) of motor casing 20 which is closed by a removable cover 60 on the casing's exterior.

Figure 5:
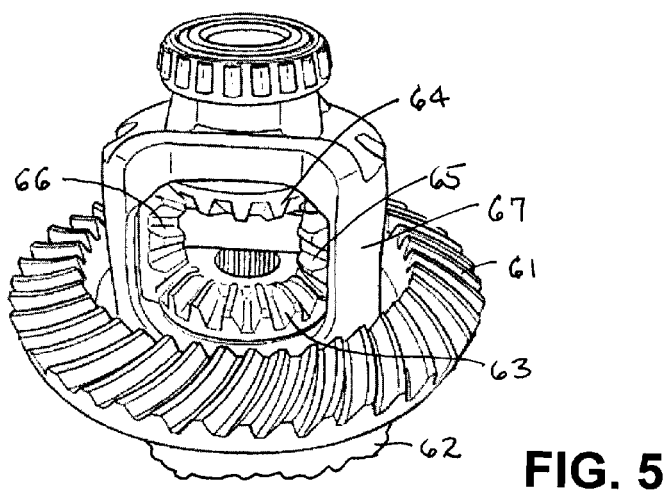
FIG. 5 is a perspective view of a differential mechanism by itself.

Differential gear mechanisms 23, 27 are essentially identical. As shown in FIG. 5, each mechanism comprises a ring gear 61 mounted on a ring gear carrier 62 which is journaled for rotation on the respective differential casing 22, 26 about the axis of the respective differential's two drive shafts 29, 32 and 35, 38. Each differential gear mechanism further comprises a left side gear 63 and a right side gear 64.

The left side gear 63 of the respective differential gear mechanism 23, 27 is rotationally coupled to the respective left drive shaft 29, 35 by mutually engaged splines, and the right side gear 64 of the respective differential gear mechanism 23, 27 is rotationally coupled to the respective right drive shaft 32, 38 by mutually engaged splines. Two aligned spider gears 65, 66 are supported for independent rotation on opposite sides of a cage 67 which is part of ring gear carrier 62.

The two side gears 63, 64 can rotate on the respective ring gear carrier 62 via their own respective bearing about the common axis of the respective drive axle's drive shafts.

Each pinion 48, 51 meshes with the respective ring gear 61. Rotation of pinion 51 about axis 25 rotates ring gear 61 of differential gear mechanism 23, including cage 67. The rotation of ring gear 61 is imparted to the respective side gears 63, 64 because spider gears 65, 66 are in mesh with both side gears. The two drive shafts of each drive axle will rotate at equal speeds when the vehicle is being steered in a straight line, but the differential gear mechanism will allow one drive shaft to rotate at a slower speed than the other when the vehicle is being steered to turn in the direction of the slower rotating drive shaft.

The electric motor formed by outer rotor 42 and inner rotor 43 operates to rotate the two rotors at the same speed but in opposite directions about axis 25 as viewed in one direction along axis 25. The equal, but opposite, rotations occur because of interaction between an inner rotor electromagnetic field pattern created by electric D.C. current flow from electric generator 3 through brushes 57, 58 and slip rings 55, 56 to the inner rotor armature winding of inner rotor armature 47 and a an outer rotor magnetic field pattern created by powerful permanent magnets, such as rare earth magnets, of permanent magnet assembly 53 of outer rotor 42.

The inner rotor armature winding may comprise individual coil windings which are commutated to the current source as inner rotor 43 turns about axis 25. By reversing the direction of D.C. source current to the inner rotor armature winding, the rotations of the respective rotors can be reversed.

If outer rotor shaft 44 is rotating in a counterclockwise direction as viewed in the direction from bevel pinion gear 48 toward bevel pinion gear 51, rear axle drive shafts 35, 38 will rotate in a direction which causes rear axle wheels 37, 40 to rotate in a direction which propels truck vehicle T forward. At the same time, bevel pinion gear 51 is rotating clockwise, causing front axle drive shafts 29, 32 and rear axle wheels 37, 40 to rotate in a direction which also propels truck vehicle T forward. By reversing the direction of D.C. source current to the inner rotor armature winding, the front axle wheels and the rear axle wheels will propel truck vehicle T in reverse.

In other words, the electric motor is operable to cause outer rotor 42 and inner rotor 43 to rotate in opposite directions about the axis as viewed in a direction from one differential gear mechanism toward the other. Consequently, both the left and right drive shafts 29, 32 of front tandem axle 15 and the left and right drive shafts 35, 38 of rear tandem axle 16 rotate in identical directions of rotation when viewed from a direction transverse to axis 25, i.e. from a side of truck vehicle T.

Temperature of the electric motor can be regulated by controlling flow of coolant through coolant passages in motor casing 20.

Figure 4:
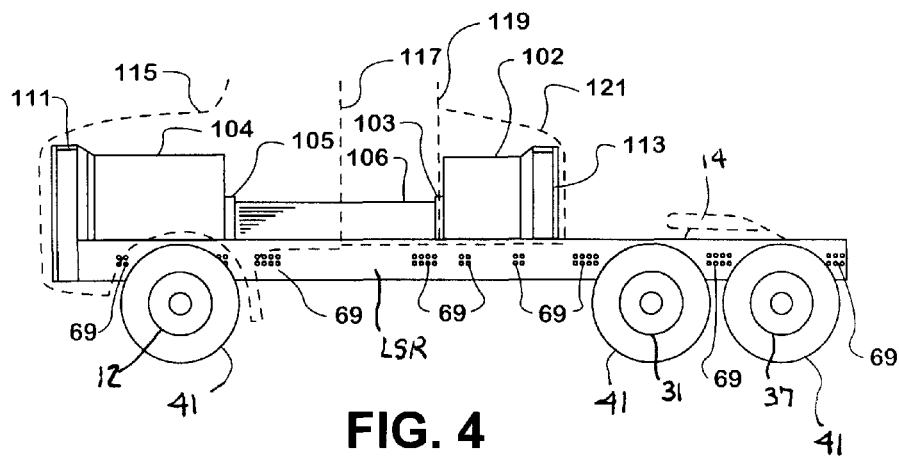
FIG. 4 is a left side elevation view of another truck vehicle.

FIG. 4 illustrates a truck vehicle having a longitudinal mounting of a dual-engine, variable-power drive. The same reference numerals as used in prior Figs. are used in FIG. 4 to identify like components.

The truck vehicle comprises a chassis frame having a right side rail extending from front to rear, a left side rail LSR extending from front to rear, and various cross-members bridging the side rails and securely fastened to the side rails by Huck fasteners 69.

Front steerable wheels are suspended from the chassis frame. A structural electric tandem axle module 13 is suspended from the chassis frame underneath fifth wheel 14. The dual-engine, variable-power drive operates module 13 to deliver torque to the wheels of each tandem axle to propel the truck vehicle.

The dual-engine, variable power drive module comprises a rear internal combustion engine 102 and a front internal combustion engine 104 at opposite lengthwise ends. Drive 100 also comprises a rear hydraulic internal wet-disk clutch 103, a front hydraulic internal wet-disk clutch 105, and an electric generator 106.

Each flywheel is coupled through the respective clutch 103, 105 to a respective end of a rotor shaft of electric generator 106 whose housing is fastened to the blocks of engines 102, 104 so that the generator is thereby supported by the engine blocks. When a clutch is engaged, it couples flywheel rotation to the rotor shaft of generator 106, and when a clutch is disengaged, it does not couple flywheel rotation to the shaft of generator 106.

In FIG. 4 the front of front engine 104 and the front of rear engine 102 face in opposite directions at the far ends of drive 100. A cooling module 111 for engine 104 is mounted on chassis frame 52 frontally of engine 104, and a cooling module 113 for engine 102 is mounted on chassis frame 52 rearward of engine 102.

Shown in phantom in FIG. 4 are a front hood 115 covering engine 104 and having a grill frontally of cooling module 111. The rear of a day cab is marked at 117 and that of a sleeper cab at 119. A rear hood 121 covers engine 102 and has a grill rearward of cooling module 113. The rear hood will extend to the rear of either type of cab.

The truck can also provide brake energy recovery by using the driven axle wheels to operate the rotors 42, 43 as an electric generator to charge an energy storage device or system, such as a battery, battery bank, or ultra-capacitor.

Figure 6:
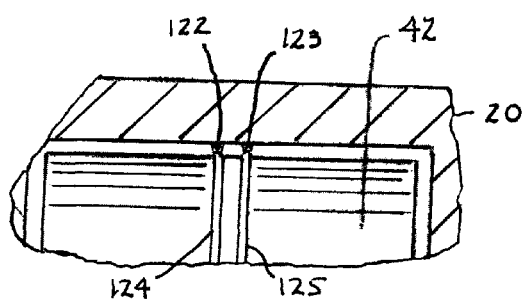
FIG. 6 is a fragmentary view of a modification.

FIG. 6 shows a modification in which the outer rotor, instead of comprising powerful permanent magnets as already described, comprises an outer rotor winding which is supplied with electric current from generator 3 to create an electromagnetic field pattern which interacts with the electromagnetic field pattern created by current flow through the inner rotor armature winding. The electric current to the outer rotor winding is supplied through brushes 122, 123 on motor casing 20 and slips rings 124, 125 on outer rotor 42.

The suspensions of the front tandem axle and the rear tandem axle can be independent. The right wheel suspension of either axle can be made independent of the left wheel suspension of the same axle by including a CV joint in the operative coupling from the differential to each wheel.

What is claimed is:

1. A tandem axle module comprising:
    a structurally rigid housing;
    a front tandem axle mounted on the housing and comprising a front casing containing a differential gear mechanism having a right side gear rotationally coupled with a right drive shaft and a left side gear rotationally coupled with a left drive shaft;

a rear tandem axle mounted on the housing and comprising a rear casing containing a differential gear mechanism having a right side gear rotationally coupled with a right drive shaft and a left side gear rotationally coupled with a left drive shaft;

an electric motor comprising an outer rotor supported on the housing for rotation about a longitudinal axis and an inner rotor supported on the housing for rotation about the longitudinal axis, the electric motor being operable to cause the outer rotor and the inner rotor to rotate in opposite directions about the longitudinal axis as viewed in a direction from one differential gear mechanism toward the other and cause the right drive shaft and the left drive shaft of the front tandem axle and the right drive shaft and the left drive shaft of the rear tandem axle to rotate in identical directions of rotation when viewed from a direction transverse to the longitudinal axis;

further including a front pivot bearing mounting the front casing of the front tandem axle on the housing for pivotal motion relative to the housing about the longitudinal axis and a rear pivot bearing mounting the rear casing of the rear tandem axle on the housing for pivotal motion relative to the housing about the longitudinal axis.

2. A tandem axle module as set forth in claim 1 in which one rotor comprises an electromagnetic field pattern created by electric current flow through an armature winding on the one rotor and the other rotor comprises an electromagnetic field pattern created by electric current flow through an armature winding on the other rotor.

3. A tandem ax e module as set forth in claim 1 in which one rotor comprises an electromagnetic field pattern created by electric current flow through an armature winding on the one rotor and an other rotor comprises a magnetic field pattern created by permanent magnets on the other rotor.

4. A tandem axle module as set forth in claim 3 in which the electric current flow through the armature winding comes from an external generator and through brushes on the housing and slip rings on the one rotor.

5. A tandem axle module as set forth in claim 3 in which the one rotor is the inner rotor and toe other rotor is the outer rotor.

6. A vehicle comprising:
a chassis frame having a right side rail and a left side rail;
a tandem axle drive module comprising a structurally rigid housing mounted on the chassis frame between the right side rail and the left side rail;
the module further comprising a front tandem axle comprising a front casing mounted on the housing and containing a front differential gear mechanism having a right side gear rotationally coupled with a right drive shaft and a left side gear rotationally coupled with a left drive shaft;
right and left front axle drive wheels respectively coupled for rotation with the right and left drive shafts respectively of the front tandem axle;
the module further comprising a rear tandem axle mounted comprising a rear casing mounted on the housing and containing a rear differential gear mechanism having a right side gear rotationally coupled with a right drive shaft and a left side gear rotationally coupled with a left drive shaft;

right and left rear axle drive wheels respectively coupled for rotation with the right and left drive shafts respectively of the rear tandem axle;

the module further comprising an electric motor comprising an outer rotor supported on the housing for rotation about a longitudinal axis and an inner rotor supported on the housing for rotation about the longitudinal axis, the electric motor being operable to cause the outer rotor and the inner rotor to rotate in opposite directions about the longitudinal axis as viewed in a direction from one differential gear mechanism toward an other and cause the right drive shaft and the left drive shaft of the front tandem axle and the right drive shaft and the left drive shaft of the rear tandem axle to rotate in identical directions of rotation when viewed from a direction transverse to the longitudinal axis;

and steerable right and left wheels forward of the front tandem axle for steering the direction of travel of the vehicle;

further including a front pivot bearing mounting the front casing of the front tandem axle on the housing for pivotal motion relative to the housing about the longitudinal axis and a rear pivot bearing mounting the rear casing of the rear tandem axle on the housing for pivotal motion relative to the housing about the longitudinal axis.

7. A vehicle as set forth in claim 6 in which one rotor comprises an electromagnetic field pattern created by electric current flow through an armature winding on the one rotor and an other rotor comprises an electromagnetic field pattern created by electric current flow through an armature winding on the other rotor.

8. A vehicle as set forth in claim 6 further comprising an electric generator operated by at least one internal combustion engine for sourcing electric current to the electric motor.

9. A vehicle as set forth in claim 6 in which one rotor comprises an electromagnetic field pattern created by electric current flow through an armature winding on the one rotor and an other rotor comprises a magnetic field pattern created by permanent magnets on the other rotor.

10. A vehicle as set forth in claim 9 in which the electric current flow through the armature winding comes from an external generator and through brushes on the housing and slip rings on the one rotor.

11. A vehicle as set forth in claim 9 in which the one rotor is the inner rotor and the other rotor is the outer rotor.

12. A vehicle as set forth in claim 6 further comprising a driver's cab mounted on the chassis frame.

13. A vehicle as set forth in claim 12 further comprising a fifth wheel mounted on the chassis frame above the module.

\* \* \* \* \*